United States Patent [19]
Yoshioka et al.

[11] Patent Number: 5,230,973
[45] Date of Patent: Jul. 27, 1993

[54] METHOD OF RECORDING AND ERASING INFORMATION IN AN ERASIBLE OPTICAL RECORDING MEDIUM

[75] Inventors: Kazumi Yoshioka, Kyoto; Takeo Ohta, Nara; Masami Uchida; Katsumi Kawahara, both of Osaka; Shigeaki Furukawa, Nara, all of Japan

[73] Assignee: Matsushita Electric Industrial Co., Ltd., Osaka, Japan

[21] Appl. No.: 573,246

[22] Filed: Aug. 24, 1990

Related U.S. Application Data

[63] Continuation-in-part of Ser. No. 559,166, Jul. 30, 1990, Pat. No. 5,194,363.

[30] Foreign Application Priority Data

| Apr. 27, 1990 | [JP] | Japan | 2-13382 |
| Apr. 27, 1990 | [JP] | Japan | 2-113380 |
| Apr. 27, 1990 | [JP] | Japan | 2-113383 |
| May 10, 1990 | [JP] | Japan | 2-121481 |
| Jun. 19, 1990 | [JP] | Japan | 2-160735 |
| Jun. 19, 1990 | [JP] | Japan | 2-160736 |

[51] Int. Cl.$^5$ .............................................. G11B 5/02
[52] U.S. Cl. .................................... 430/19; 369/54; 369/116; 369/288; 430/495
[58] Field of Search ............... 430/495, 19; 346/135.1; 365/113; 369/286, 288, 275.2, 116, 54

[56] References Cited

U.S. PATENT DOCUMENTS

| 4,419,750 | 12/1983 | Home | 369/116 |
| 4,796,250 | 1/1989 | Kobayashi et al. | 369/116 |
| 4,811,329 | 3/1989 | Shikama et al. | 369/116 |
| 4,937,809 | 6/1990 | Miyadera et al. | 369/106 |
| 4,939,717 | 7/1990 | Ohno et al. | 369/116 |
| 4,944,037 | 7/1990 | Ando | 369/116 |
| 4,949,329 | 8/1990 | Forman et al. | 369/121 |
| 4,998,238 | 3/1991 | Mizunoe et al. | 369/116 |
| 5,024,910 | 6/1991 | Ohta et al. | 430/19 |
| 5,038,338 | 8/1991 | Terao et al. | 369/116 |
| 5,107,482 | 4/1992 | Goto et al. | 369/116 |

FOREIGN PATENT DOCUMENTS

| 0345752 | 12/1989 | European Pat. Off. | 369/121 |
| 58-85937 | 5/1983 | Japan | 369/121 |
| 62-291727 | 12/1987 | Japan | 369/116 |

OTHER PUBLICATIONS

Phase Change Disk Media Having Rapid Cooling Structure Technical paper by Ohta et al. published in the Japanese Journal of Applied Physics, vol. 28 (1989).
Million Cycle Overwritable Phase Change Optical Disk Media Technical paper by Ohta et al., presented at the SPIE vol. 1078 Optical Data Storage Topical Meeting, Jan. 17-19, 1989.

*Primary Examiner*—Charles L. Bowers, Jr.
*Assistant Examiner*—M. Angebrannt
*Attorney, Agent, or Firm*—Amster, Rothstein & Ebenstein

[57] ABSTRACT

An optical information recording medium is disclosed in which the recording layer is a material capable of absorbing energy and being reversibly converted between a substantially non-crystalline or amorphous state and a substantially crystalline state. The recording layer is a Te-Ge-Sb composition which also contains nitrogen. The optical recording medium includes a substrate onto which is sequentially deposited a first dielectric layer, a nitrogen-containing recording layer, a second dielectric layer and a metallic reflecting layer. In order to control the sensitivity of the medium to laser irradiation, the second dielectric layer is graded in thickness and progressively becomes thicker as a function of increasing radius. Alternatively, in another embodiment, the reflecting layer is graded in thickness, and progressively becomes thinner as a function of increasing radius. To further optimize the write/erase characteristics, the write to erase power ratio, as well as the recording duty cycle of the laser are varied as a function of radial position.

3 Claims, 2 Drawing Sheets

METHOD OF RECORDING AND ERASING INFORMATION IN AN ERASABLE OPTICAL RECORDING MEDIUM

This application is a continuation-in-part of copending U.S. application Ser. No. 559,166, filed Jul. 30, 1990, entitled OPTICAL RECORDING MEDIUM AND PRODUCTION PROCESS FOR THE MEDIUM now U.S. Pat. No. 5,194,363.

This invention is directed to an optical recording medium which can store large quantities of information. Recording is performed by momentarily changing the temperature of a spot on a recording layer in the medium, by irradiating the spot with laser light or other energetic radiation. The irradiation causes a reversible rearrangement of the atomic structure of the recording layer from a first state having one set of optical properties, to a second state having different optical properties. Switching the recording layer between these two states permits information to be either recorded thereon or erased.

BACKGROUND OF THE INVENTION

Prior art optical recording media are known in which information may be written, but not erased. These "write-once" media have a thin film recording layer of $TeO_x$ ($0<x<2.0$) in which Te and $TeO_2$ are the main compositional constituents.

The prior art also shows efforts directed towards the development of erasable optical recording media, in which it is possible to repeatedly write and erase information. Erasable recording media are being developed in which a small spot on a recording layer may be heated and melted by a focused laser beam. Rapid cooling transforms the molten spot into a non-crystalline amorphous material, having optical properties which are different from a crystalline state of the material. The same spot may subsequently be heated by the laser beam to a temperature which causes the amorphous state to be converted to the crystalline state. Information may generally be recorded by either forming the amorphous state or the crystalline state, with erasure accomplished by converting the recorded spots on the layer to the opposite state.

Materials which have been investigated in the prior art for such erasable recording media include thin film compositions of the chalcogen elements, as exemplified by $Ge_{15}Te_{81}Sb_2S_2$, etc., as reported by Ovshinsky et al. In addition, thin film recording layers formed from combinations of a chalcogen/elements with an element or elements selected from Group V of the periodic table or an element or elements selected from Group IV of the periodic table (i.e., Ge, $As_2S_3$, $As_3Se_3$ or $Sb_2Se_3$) have also been widely investigated in the prior art.

Generally, an optical recording medium is in the shape of a circular disc, which is rotated during operation so that a movable laser beam can be rapidly focused over the entire disc surface. The thin film recording layer is deposited, along with other layers, on a transparent substrate in which grooves are formed to serve as guides for the laser light. The thin film recording layer may initially be prepared in the crystallized state.

To record information, laser light is focused to a spot on the recording layer of about one micron in diameter and is intensity-modulated between a first high peak power level and a second lower power bias level in accordance with the information to be recorded. Recording is performed while the disc is rotating by irradiating spots on the disc with a high peak power level, which is sufficient to increase the temperature of those spots above the melting point of the thin film recording layer. As these spots rapidly cool, the information is recorded by the formation of substantially non-crystalline, or amorphous spots in the recording layer.

To erase the information, the amorphous spots are irradiated with the lower power bias level of the laser light. Upon irradiation with this bias power level, the irradiated areas are elevated in temperature above the crystallization temperature of the thin film recording layer. Amorphous spots are thereby converted to substantially crystalline spots, and the information recorded therein is accordingly erased.

By utilizing a single laser beam modulated between a high peak power level and a lower power bias level, in combination with a recording layer which may be controllably converted between a substantially crystalline structure and a substantially non-crystalline or amorphous structure in the manner described above, an optical recording medium is produced in which it is possible to overwrite information in a simple procedure.

Since the thin film recording layer, during operation, is repeatedly heated, the optical recording medium is generally fabricated by sandwiching the thin film recording layer between two protective dielectric layers, which have the property of being highly heat resistant. These protective dielectric layers serve to thermally insulate the heated thin film recording layer from other thermally sensitive layers, such as the substrate and various adhesive layers. The thermal response, and in particular the rapid or slow cooling characteristics of the recording layer depend upon the thermal conductivity of the dielectric layers. Thus, by carefully selecting both the composition and geometry of these dielectric layers, it is possible to control and optimize the write/erase characteristics of the medium.

In the development of practical optical recording media, it is important to maintain the stability of the record/erase characteristics as a function of many write/erase cycles. After repeated cycling, deterioration of these characteristics may result from thermal damage to the disc substrate or other layers. This is manifested during operation as an increase in noise. In addition, a physical shifting of the thin film recording layer within the guide grooves of the substrate, generally along the direction of rotation of the disc, has also been identified as a factor leading to the deterioration of the write/erase characteristics after many cycles. The physical shifting of the layer also results from thermally induced stress.

As to the erasure characteristics, the melting point of a substantially non-crystalline or amorphous film containing Te is typically in a wide temperature range of 400° C. to 900° C. As explained, crystallization is generally achieved by increasing the temperature of the irradiated spots above the crystallization temperature, followed by a gradual cooling. The peak temperature reached is within the crystallization temperature range, and is lower than the melting point of the thin film recording layer. However, when the crystallized layer is subsequently irradiated with laser light having a higher power level, it is heated to a temperature above the melting point of the material. As the molten area rapidly cools, the material transforms to the substantially non-crystalliine or amorphous state and an amorphous spot is thereby formed which may represent the recorded information. During formation of the amorphous spot, the faster the cooling rate, the more uniform will be the resulting amorphous state. If the cooling rate is too low, a difference in the degree of non-crystallinity between the center and the outer periphery of the spot may result, which can lead to incomplete or non-uniform erasure during subsequent write/erase cycles. Thus, the higher the cooling rate during formation of the amorphous state, the better the erasure characteristics of the optical recording medium.

SUMMARY OF THE INVENTION

It is an object of the present invention to provide an erasable optical recording medium having improved stability or cyclability after many write/erase cycles.

It is another object of the present invention to provide an erasable optical recording medium having improved laser power dependence during write/erase operations, improved erasure characteristics, and a non-varying sensitivity.

The optical recording medium of the present invention has a thin film recording layer which is initially prepared in the crystalline state. The recording layer can absorb laser light energy during irradiation, thereby melting the recording layer at the irradiated spot. Upon rapid cooling, the irradiated spot converts to a substantially non-crystalline or amorphous state. The thin film recording layer may thereafter be converted back to a substantially crystalline state by increasing the temperature of the amorphous state. This process may be repeated to record and erase information.

In the present invention, the optical recording medium of the preferred embodiment has a thin film recording layer which contains nitrogen. In a preferred embodiment of the invention, the thin film recording layer has a composition which is approximately represented by $Te_{53.2}Ge_{21.3}Sb_{25.5}$, into which is additionally incorporated a quantity of nitrogen for the purposes of improving the thermal characteristics of the recording layer and increasing the stability of the recording layer against degradation induced by the thermal stress of repeated heating and cooling cycles. The incorporation of nitrogen in the thin film recording layer may form a nitride substance which is effective in preventing or reducing the physical shifting of the recording layer which otherwise occurs with repeated cycling.

To fabricate the optical recording medium, a transparent substrate in the shape of a circular disc has sequentially deposited thereon a first dielectric layer, a thin film recording layer, a second dielectric layer and a metallic reflecting layer. By making the thickness of the second dielectric layer thinner than that of the first dielectric layer, the reflecting layer is placed close to the top surface of the recording layer. This helps to achieve a rapid cooling of the thin film recording layer after irradiation to produce a highly uniform amorphous or substantially non-crystalline recorded spot. High uniformity of the amorphous spot improves the cyclability characteristics of the medium. The deleterious shifting of the thin film recording layer, being inhibited by the incorporation of nitrogen in the composition of the recording layer, further improves the cyclability characteristics of the optical recording medium and also results in an optical recording medium which has improved characteristics with respect to the power dependency of the laser light.

Further, in order to ensure that the sensitivity of the recorded layer to laser irradiation at the inner circumferential periphery of the layer is the same as that at the outer periphery, even though these locations on the disc rotate with different linear speeds, the film thickness of the second dielectric layer is made progressively thicker as a function of radial position from the center of the disc. Alternatively, in another embodiment of the invention, the thickness of the reflecting layer is made thinner as a function of increasing radial position as measured from the center of the disc.

BRIEF DESCRIPTION OF THE DRAWINGS

For a fuller understanding of the nature, features and advantages of the present invention, reference should be made to the following detailed description of various preferred, but nonetheless illustrative embodiments of the invention, as illustrated by and taken in conjunction with the accompanying drawings wherein.

DESCRIPTION OF THE PREFERRED EMBODIMENTS

Figure 1:
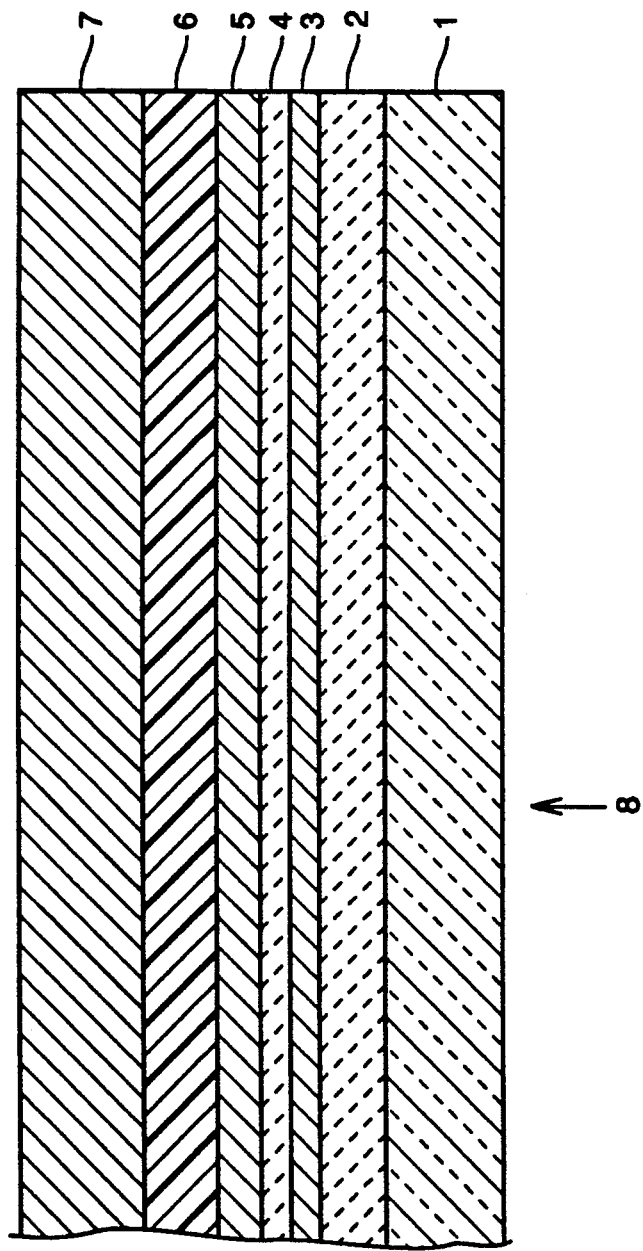
FIG. 1 is a highly enlarged cross-sectional view which shows the structure of an optical information recording medium in accordance with the present invention, wherein the various layers which form the optical recording medium are shown. The thickness of the layers is not shown to scale.
Figure 2:
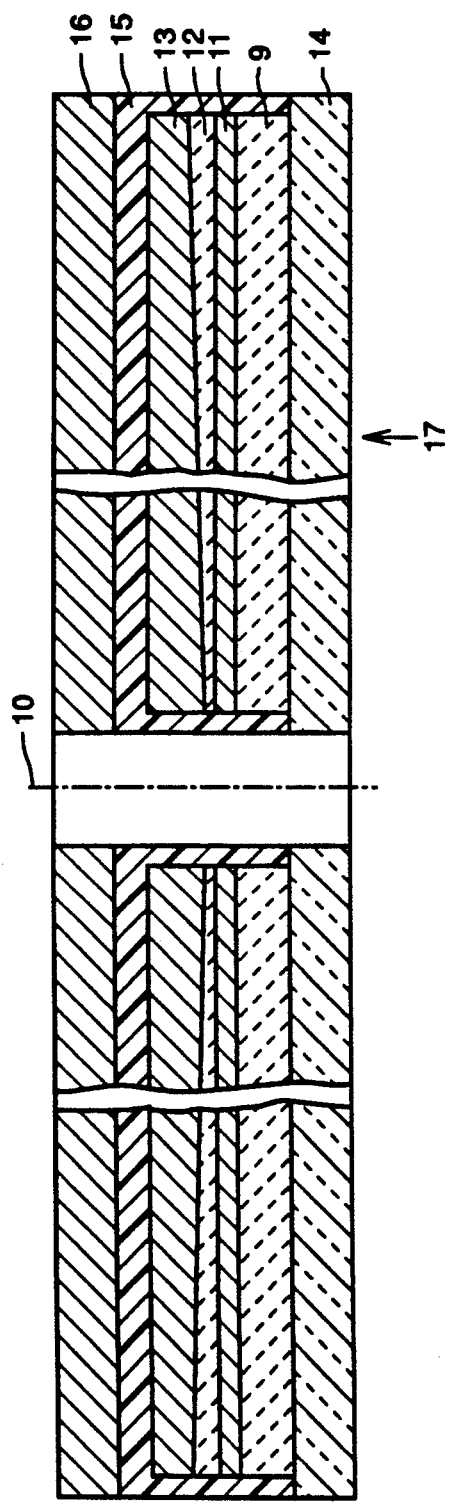
FIG. 2 is a highly enlarged cross-sectional view, shown broken along the radial direction, which shows the detailed structure of a disc having an optical information recording medium in accordance with a preferred embodiment of the present invention in which the second dielectric layer progressively increases in thickness as the radial position along the disc increases. The figure is not to scale.
Figure 3:
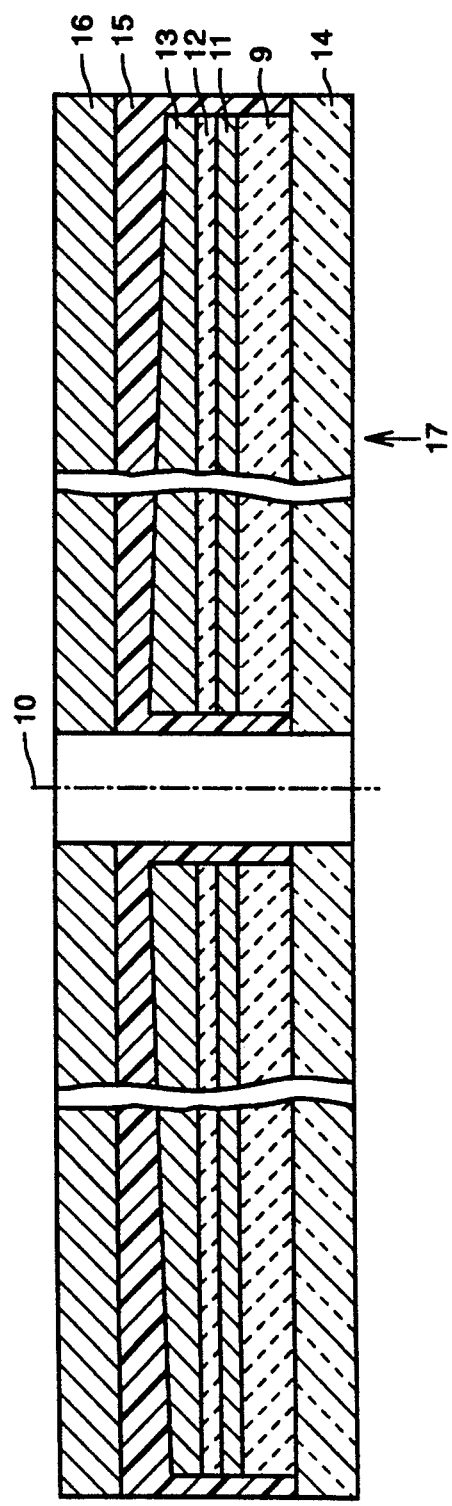
FIG. 3 is a highly enlarged cross-sectional view, shown broken along the radial direction, which shows the detailed structure of a disc having an optical information recording medium in accordance with yet another embodiment of the present invention, wherein the thickness of the reflecting layer progressively decreases as the radial position along the disc increases. The figure is not to scale.

An understanding of the optical recording medium of the present invention, and the improvements which it presents over the prior art, may best be obtained with reference to FIGS. 1-3. FIG. 1 generally shows the cross sectional layered structure of an optical recording medium having various material layers formed on a substrate 1. Substrate 1 may be a resin-type material such as polycarbonate, in which grooves have been preformed for guiding the laser light. Alternatively, substrate 1 may be a glass plate in which grooves are pre-formed by a 2P process, or otherwise directly formed on the glass plate. Substrate 1 may also be pre-formed with bit rows for guiding the laser light.

Deposited onto substrate 1 is a first dielectric layer 2, which may consist of a mixed film of ZnS and $SiO_2$. The thickness of the first dielectric layer 2 may be approximately 160 nanometers (nm). Covering the first dielectric layer 2 is a thin film recording layer 3 having a chalcogenide composition. In a preferred embodiment, the thin film recording layer is approximately a $Te_{53.2}Ge_{21.3}Sb_{25.5}$ composition which additionally has nitrogen incorporated therein, and is deposited to a film thickness of about 20 nm. On top of the thin film recording layer 3 is a second dielectric layer 4 of the same general composition as the first dielectric layer 2, but having a preferred film thickness of only about 25 nm.

An aluminum alloy forms a reflecting layer 5, which is deposited on top of the second dielectric layer 4 to a thickness of about 130 nm. A protective plate 7 is adhered by means of an adhesive layer 6 to complete the structure. Protective plate 7 may be another substrate, such as substrate 1.

In operation, laser light energy for the purpose of recording, erasing and reading information stored in the optical recording medium of FIG. 1 is incident thereon in the direction indicated by arrow 8. The intensity of the laser beam is modulated between a first high power level and a second lower power bias level in accordance with the information to be recorded or erased. Irradiation with the first high power level produces a substantially non-crystalline or amorphous spot, whereas irradiation at the lower power bias level transforms an amorphous spot to a crystalline spot. Reading of the information is generally performed by illuminating the disc with a much lower power of the same laser than used in the write/erase operation and detecting the light which is reflected from the optical recording medium.

The first and second dielectric layers 2, 4, the thin film recording layer 3, and the reflecting layer 5, may be deposited by various deposition techniques, as exemplified by vacuum deposition or sputter deposition. In a preferred embodiment of the present invention, the thin film recording layer is deposited by means of a sputter process performed in a mixture of argon and nitrogen gas. During such sputter deposition, the partial pressure of nitrogen is an important parameter which determines the characteristics and quality of the deposited film, and must therefore be properly controlled. An appropriate range for the nitrogen partial pressure during sputter deposition of the thin film recording layer is the range of $1.0 \times 10^{-5}$ to $1.0 \times 10^{-4}$ Torr. If the nitrogen partial pressure is less than $1.0 \times 10^{-5}$ Torr during deposition of the recording layer, then the advantageous incorporation of nitrogen into the recording layer, which leads to improvement in the cyclability characteristics of the layer, becomes reduced. On the other hand, if the partial pressure of nitrogen during deposition exceeds $1.0 \times 10^{-4}$ Torr, then deleterious changes in the optical characteristics (e.g. the refractive index) of the thin film recording layer are produced, and the parameters which control the recording and erasing of information are adversely affected. For example, the rate at which the material is able to transition between the amorphous and crystalline states may be affected and be rendered non-optimum.

As explained, for fabrication of the thin film "recording layer", it is preferable to use an electron beam or vacuum evaporation process, or a sputtering process. If a sputtering process is chosen, it is also possible to prepare a sputter target which contains one or more nitrides of Ge, Te and Sb. When using this type of target, it is possible to carry out the sputter deposition by only using a rare gas, such as argon. It is also possible to provide the above-mentioned nitride or nitrides in an evaporation source.

With respect to the composition of the first dielectric layer 2 and the second dielectric layer 4, the quantity of ZnS and $SiO_2$ in these layers is generally selected so that the concentration of $SiO_2$ is about 20 mol % of the overall composition. The composition of the dielectric layers need not be limited to this value however, but may vary over a wide range. If the concentration of $SiO_2$ is less than about 5 mol %, then the effect of $SiO_2$ on the mixture, which is to reduce the diameter of crystallite particles in the dielectric layers, is lessened. On the other hand, if the concentration of $SiO_2$ in the mixture is above 50 mol %, then the overall properties of the film degrade. Thus, in the preferred embodiment, it is appropriate to keep the concentration of $SiO_2$ in the first and second dielectric layers 2, 4 in the range of 5 to 40 mol %.

In the preferred embodiment, the thickness of the second dielectric layer 4 is kept small, generally in the range of about 20 nm. By keeping the second dielectric layer 4 relatively thin, the reflecting layer 5, which also acts as a thermal dissipation layer, is placed closer to the top surface of the thin film recording layer 3. Thus, the heat generated in the thin film recording layer 3 by the laser beam during recording and erasing may be rapidly conducted to the reflecting layer 5, to produce a rapid cooling of the thin film recording layer 3 which results in a highly uniform amorphous spot.

During operation, it is generally useful to vary the ratio of the recording power ($P_w$) to that of the erasing power ($P_e$), in accordance with the linear speed of the irradiated spot on the recording layer, which increases with increasing radial position along the disc. The ratio $P_w/P_e$ is preferably selected to be in the range of 1.6–2.6, with higher values of the ratio being used at lower linear speeds. If the power ratio is less than 1.6, then the erase power is too high. In this case, the heat load on the thin film recording layer becomes excessive, and the cyclability of the write/erase characteristics will deteriorate with time. On the other hand, if the power ratio exceeds 2.6, the bit error rate will show deterioration after repeated cycling.

In addition to varying the power ratio, it is also useful to vary the recording duty cycle of the laser according to the linear speed of the disc. A preferred range for the recording duty cycle is 20%–40%, with the higher duty cycle being used at lower linear speeds.

Experiments have been performed on a disc structure as generally shown in FIG. 1, and formed in accordance with the above description, in which the over-write characteristics of a signal of frequency $f1 = 3.43$ MHz and a signal of frequency $f2 = 1.25$ MHz were measured at an outer disc diameter of 130 mm for a disc rotating at 1800 rpm (which corresponds to a linear speed at that disc position of 8 m/sec). Successive over-write cycles were performed by simultaneously recording and erasing, in which a substantially non-crystalline or amorphous record mark was formed by irradiation at a high laser power level of 16 mw and crystallized by irradiation at a low laser bias power level of 8 mw. The laser was focused to a circular spot of about 1 micron in diameter.

As a result of these repeated over-write measurements, a C/N ratio for the recorded signal of 55 db was obtained, with an erasability of 30 db. The bit error rates were measured as a function of repetitive cycles, with no measurable deterioration observed for over one million cycles.

In a second preferred embodiment show in cross-sectional view in FIG. 2, a circular disc structure rotable about an axis 10 includes at least four layers of the structure shown in FIG. 1, i.e. a first dielectric layer 9, a thin film recording layer 11, a second dielectric layer 12, and a reflecting layer 13, sequentially deposited on a substrate 14. The structure also includes an encapsulating material 15 and a top cover 16. Laser light is directed onto the structure in the direction of arrow 17. In this second preferred embodiment, the thickness of the second dielectric layer 12 is graded in such a manner that it becomes increasingly thicker as the radial position along the disc increases from an inner periphery of the second dielectric layer 12 closest to the disc center to an outer periphery at the outer diameter thereof.

As the laser spot is focused at different radial positions along the disc, the linear speed of the disc surface with respect to the laser spot increases as the spot moves to increasing radial postions. The film thickness of the second dielectric layer 12 is graded in the manner described above in order to prevent the recording sensitivity from varying significantly as a result of this difference in linear speed of the medium.

Since the laser spot interacts over a larger area near the outer periphery of the disc as compared to the inner periphery (assuming constant angular velocity), it is helpful to compensate for this effect by reducing the cooling rate of the recording layer as the laser beam moves to the outer periphery of the disc where the linear speed is highest. This may be accomplished by increasing the thickness of the second dielectric layer 12 so that the conduction of heat from the recording layer 11 is correspondingly reduced. For the same reasons, it is useful to increase the cooling rate along the disc as one moves to the inner periphery thereof by progressively thinning the second dielectric layer 12 as the radius decreases. Thus, if the linear speed $V1 > V2$, and if D1 and D2 define the thicknesses of the second dielectric layer 12 at its outer periphery and inner periphery, respectively, then it is desirable to have $D1 > D2$.

In the preferred embodiment, the film thickness ratio D1/D2 is in the range of 1 to 1.5. If the film thickness ratio is less than 1 (corresponding to the opposite case in which the film greater of the second dielectric layer 12 at the inner periphery is thicker than at the outer periphery), the heat load on the recording layer 11 may become excessive, and the characteristics of the optical recording medium after multiple write/erase cycles may deteriorate. Further, at the outer periphery of the disc the heat load may be insufficient, causing the sensitivity to be reduced and thereby requiring a higher laser power to effectuate proper operation. On the other hand, if the film thickness ratio D1/D2 is made larger than about 1.5, then there results an undesirably large thickness difference from a fabrication perspective.

A disc having the above mentioned composition and graded structure for the second dielectric layer 12 was studied by investigating the over-write characteristics using a signal of frequency $f1 = 3.43$ MHz and a signal of frequency $f2 = 1.0$ MHz applied at an outer diameter of 130 mm to a disc rotating at 1800 rpm (which corresponds to a linear speed at that disc location of 8 m/sec). The over-write measurements were performed by simultaneously recording and erasing, in which a substantially non-crystalline spot was formed by irradiation at a high laser power level of 16 mw, and then crystallized by modulating the laser light to a low power bias level of 8 mw. The focused laser spot size on the disc was about 1 micron in diameter.

In these measurements, a C/N ratio for the recorded signal of 55 db or greater was obtained, with an erasability of 30 db or greater. Measurement of bit error rates after repeated cycling showed no deterioration after more than one million cycles.

Yet another embodiment of the invention is shown in FIG. 3. The composition of the layers is generally the same as that shown in FIGS. 1 and 2. Corresponding layers and structures are designated by the same reference numerals as in FIG. 2. However, in the embodiment of FIG. 3, the thickness of the reflecting layer 13 is graded so that the film thickness is greater at the inner periphery of the reflecting layer 13 near the rotation axis 10, and gradually decreases with increasing radial position to the outer periphery of the reflecting layer 13.

As in the previous embodiment, grading of the reflecting layer 13 in this manner helps to maintain the recording sensitivity at a fairly constant level. Near the inner periphery of the disc, the linear speed is lower, so that the laser beam interacts with a relatively small region on the disc per unit time. The cooling rate on the thin film recording layer 11 must therefore be increased to avoid excessive heat accumulation. A thicker reflecting layer 13 near the inner periphery acts as a better heat sink, thereby increases the cooling rate near the inner periphery of the disc. On the other hand, as the laser beam spot moves toward the outer periphery of the disc, the linear speed increases, and the laser pulse interacts with a greater region of the disc. In this case, it is desirable to progressively reduce the cooling rate of the thin film recording layer 11, and this is accomplished in the FIG. 3 embodiment by correspondingly reducing the thickness of the reflecting layer 13 with increasing radial position from the disc axis 10.

If the film thickness of the reflecting layer 13 at its inner periphery and outer periphery are defined to be C1 and C2 respectively, then in this preferred embodiment of the invention, $C1 > C2$, with the film thickness ratio C1/C2 being preferably selected to be in the range of 1 to 1.5. If this film thickness ratio is less than 1, then the film thickness at the outer periphery is greater, the cooling rate is greater, and the recording sensitivity is thereby reduced. On the other hand, if the film thickness ratio is greater than 1.5, the cooling speed is reduced, and excessive heat accumulation may result in a deterioration of the write/erase characteristics after multiple cycles. Accordingly, in this preferred embodiment, the thickness ratio is maintained within the above-mentioned range.

Measurements made to a disc structure fabricated to have a graded thickness in the reflecting layer 13 in accordance with the above description (as generally shown in FIG. 3), resulted in a measured C/N ratio of the recorded signal of 55 db or greater, with an erasability of 30 db or greater. As to the effects of repeated write/erase cycling of the medium, no deterioration was observed after more than one million cycles.

Although the invention disclosed herein has been described with reference to particular embodiments, it is to be understood that these embodiments are merely illustrative of the different aspects in the features of the invention. As such, persons skilled in the art may make numerous modifications to the illustrative embodiments described herein and other arrangements may be devised to implement the disclosed invention which will fall within the spirit and scope of the invention described and claimed herein.

What is claimed is:

1. A method of recording information ion an optical recording medium having a recording layer capable of absorbing energy and being converted to a substantially non-crystalline stated and a substantially crystalline state, comprising the steps of:

(a) moving said optical recording medium relative to a modulated energy beam that is modulated between a recording power $P_w$ and an erasing power $P_e$;

(b) irradiating a spot on said recording layer with said modulated energy beam;

(c) varying the power ratio $P_w/P_e$ of said recording power $P_w$ to said erasing power $P_e$ in accordance with variations in the linear speed of said optical recording medium said power ratio $P_w/P_e$ being higher when said linear speed is lower; and (d) varying the recording duty cycle of said modulated energy beam in accordance with variations in the linear speed of said optical recording medium, said recording duty cycle being higher when said linear speed is lower.

2. The method of claim 1, wherein said power ratio $P_w/P_e$ varies in the range of about 1.6 to 2.6 in accordance with variations in the linear speed of said optical recording medium.

3. The method of claim 1 wherein said recording duty cycle varies in the range of about 20%–40%.

* * * * *